Aug. 7, 1934.    F. D. FOWLER    1,969,127
APPARATUS FOR TREATING RUBBER SLABS
Filed May 23, 1933
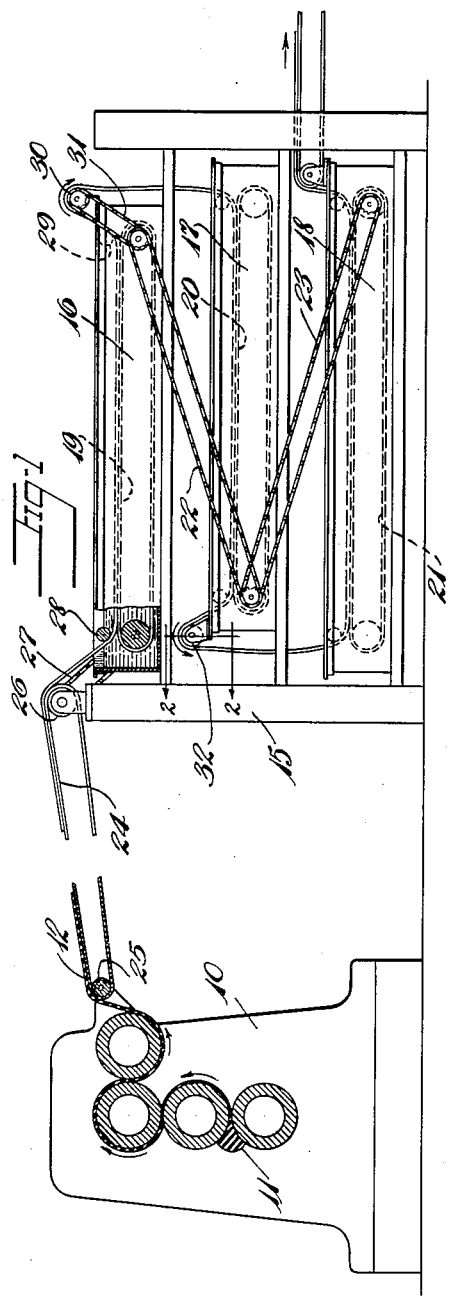
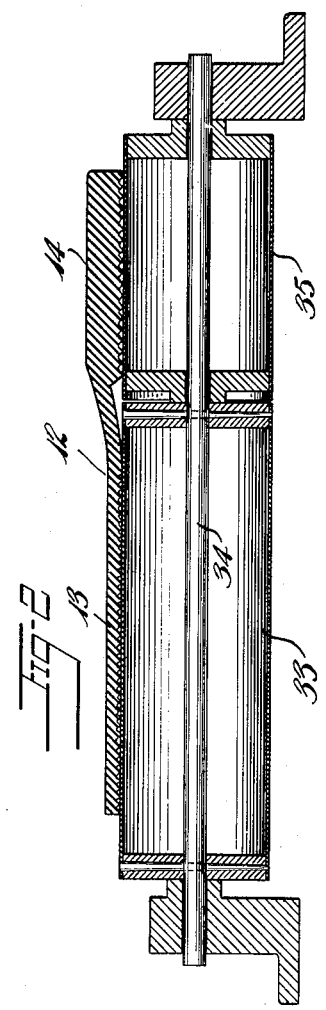
Inventor
Fred D. Fowler
By Eakin & Avery
Attys.

Patented Aug. 7, 1934

1,969,127

UNITED STATES PATENT OFFICE 1,969,127

APPARATUS FOR TREATING RUBBER SLABS

Fred D. Fowler, Newton, Mass., assignor to Hood Rubber Company, Inc., Watertown, Mass., a corporation of Delaware Application May 23, 1933, Serial No. 672,443

3 Claims. (Cl. 18—2)

This invention relates to apparatus for treating unvulcanized rubber slabs after the same have been formed and is especially useful in the treatment of outsole material in the manufacture of rubber soled shoes.

In the manufacture of rubber soled shoes it has been found convenient or desirable to form a slab of unvulcanized rubber, as by calendering or extruding, having a longitudinal zone thereof of a thickness corresponding to the desired sole and an adjoining zone of greater thickness corresponding to the heel. Before the combined soles and heels are cut from this slab it has been found desirable to heat treat the slab to remove inherent strains resulting from the forming operation. This conveniently may be accomplished by conducting the slab through one or more baths of hot water.

The material so heated becomes quite plastic and extensible. In order to conserve space and expose the face of the slab alternately to the heat it has been found convenient to pass the slab back and forth through superimposed tanks of water, and, in order to prevent stretching of the plastic material, to provide positively driven conveyor means for supporting and guiding the slab through the series of tanks.

Due to the non-uniform thickness of the slab and the necessity of changing its direction of travel by passing it around guide rolls as it passes from tank to tank, an uneven stretching of the respective zones of the slab is prevalent and results in distortion or wrinkling of one margin thereof.

The principal objects of the present invention are to overcome the difficulties of uneven stretching encountered in the aforesaid process.

Other objects will appear from the following description and the accompanying drawing.

In the drawing:

Fig. 1 is a side elevation of the apparatus, parts being broken away and parts in section to more clearly show the apparatus.

Fig. 2 is a section on line 2—2 of Fig. 1 showing one of the rolls.

Referring to the drawing, the numeral 10 designates a calendering machine whereby a mass of unvulcanized plastic rubber composition 11 is formed to provide an unvulcanized slab 12, one longitudinal zone 13 of which is relatively thin, whereas another adjoining zone 14 thereof is relatively thick.

Located adjacent the calender and aligned therewith is a frame 15 which supports a series of superimposed heat-treating tanks 16, 17, and 18 containing hot water. Submerged conveyor belts 19, 20, and 21, are provided in the respective tanks to support the slab during the treatment thereof, and are supported by suitable guide rollers which may be driven from any convenient source of power (not shown). For this purpose certain of the rolls are mounted on shafts which extend through the walls of the tank and are provided with sprockets to engage drive chains 22 and 23 whereby the conveyor belts are driven in unison.

As the slab of material passes from the calender to the heat-treating tanks it is supported by a conveyor belt 24 supported by rollers 25 and 26 mounted respectively on the calender 10 and frame 15. Roll 26 is driven in unison with the heat treating conveyor 19 by a chain 27 which engages suitable sprockets mounted on the shaft of the roll 26 and the shaft of one of the rolls which supports the conveyor 19.

In order to keep the slab submerged where it enters and leaves the tank, idle rollers such as 28 and 29 are provided in each of the tanks.

As the slab passes from tank 16 to tank 17 it is conveyed over a roller 30 driven by a chain 31 from the guide roller in the tank. A similar roller 32 guides the slab from tank 17 to tank 18. As the slab turns through a substantial angle in passing around these rollers, to avoid unequal stretching of the slab, each roller is constructed as shown in Fig. 2. That part 33 of the roller which engages the thin zone of the slab is fixed to a shaft 34 so as to be driven with the shaft. The part 35 of the roller which engages the thick part of the slab is mounted loosely on the same shaft 34 concentric with the roll 33 so as to be controlled by the velocity of the face of the thick part of the slab.

When the face of the thicker zone of the slab moves slower than the face of the thin part as where the neutral plane of the slab passes around the roll at a greater radius in the region of the heel as compared to its radius at the thinner zone, the free-running part of the roll can rotate at a correspondingly slower speed.

I claim:

1. Apparatus for treating an unvulcanized slab of plastic material having a longitudinal zone thereof thicker than the remainder of the slab, said apparatus comprising means for forming the slab, and a driven roll adapted to support one zone of the slab while the slab extends thereabout in a bight of substantial arcuate extent, and concentric therewith a free-running roll adapted to support the other zone of the same slab throughout an arc of equal extent.

2. Apparatus for treating an unvulcanized slab of rubber having a longitudinal zone thereof thicker than another longitudinal zone of the slab, said apparatus comprising a plurality of baths through which the slab successively may be conveyed, a driven roll located between baths and adapted to support the thin zone of the slab, and concentric therewith a free-running roll adapted to support a contiguous portion of the thick zone of the slab.

3. Apparatus for treating an unvulcanized slab of rubber having a longitudinal zone thereof thicker than another longitudinal zone of the slab, said apparatus comprising means for forming the slab, and a driven roll adapted to support the thin zone of the slab while the slab extends thereabout in a bight of substantial arcuate extent, and concentric therewith a free-running roll of the same diameter adapted to support the thick zone of the slab throughout an arc of equal extent.

FRED D. FOWLER.